(12) United States Patent
Weigel

(10) Patent No.: US 8,726,913 B2
(45) Date of Patent: May 20, 2014

(54) COSMETIC APPLICATOR WITH INTERNAL APPLICATORS THAT CAN BE PUSHED OUT AND ROTATED

(75) Inventor: Friedrich Weigel, Wittelshofen (DE)

(73) Assignee: GEKA GmbH, Bechhofen (DE)

( * ) Notice: Subject to any disclaimer, the term of this patent is extended or adjusted under 35 U.S.C. 154(b) by 68 days.

(21) Appl. No.: 13/380,501

(22) PCT Filed: Jun. 22, 2010

(86) PCT No.: PCT/EP2010/003809
§ 371 (c)(1),
(2), (4) Date: Mar. 22, 2012

(87) PCT Pub. No.: WO2010/149366
PCT Pub. Date: Dec. 29, 2010

(65) Prior Publication Data
US 2012/0167910 A1 Jul. 5, 2012

(30) Foreign Application Priority Data
Jun. 22, 2009 (EP) .................................. 09008154

(51) Int. Cl.
*A45D 40/26* (2006.01)
*A46B 11/00* (2006.01)

(52) U.S. Cl.
USPC .......................... 132/218; 132/320; 401/129

(58) Field of Classification Search
USPC ......... 132/218, 212, 216, 219, 123, 126, 141, 132/142, 151, 152, 160, 317, 318, 320; 401/9, 13, 25, 27, 37–39, 118, 119, 401/126–130, 261, 265, 266, 268; 15/206, 15/207, 207.2
See application file for complete search history.

(56) References Cited

U.S. PATENT DOCUMENTS

| | | | | | |
|---|---|---|---|---|---|
| 1,002,942 | A | * | 9/1911 | Taylor | 132/117 |
| 2,865,039 | A | * | 12/1958 | Kaye et al. | 15/184 |
| 3,998,235 | A | * | 12/1976 | Kingsford | 132/218 |
| 4,001,910 | A | * | 1/1977 | Peilet | 15/184 |
| 4,498,490 | A | * | 2/1985 | Seidler | 132/218 |
| 4,561,456 | A | * | 12/1985 | Gueret | 132/218 |
| 4,598,723 | A | | 7/1986 | Cole | |
| 5,121,763 | A | * | 6/1992 | Kingsford | 132/317 |
| 5,839,148 | A | * | 11/1998 | Volpenhein | 15/167.1 |
| 5,865,556 | A | * | 2/1999 | Lhuisset | 401/290 |
| 6,591,842 | B2 | * | 7/2003 | Gueret | 132/218 |

(Continued)

FOREIGN PATENT DOCUMENTS

| | | |
|---|---|---|
| EP | 1478256 B1 | 5/2006 |
| FR | 2894793 | 6/2007 |

(Continued)

*Primary Examiner* — Vanitha Elgart
(74) *Attorney, Agent, or Firm* — Setter Roche LLP

(57) ABSTRACT

The invention relates to an applicator for applying a decorative cosmetic with a flowable consistency from a storage container, such as in particular mascara, comprising an applicator brush equipped with a bristle area consisting of outwardly protruding bristles and/or bristle discs that comprises stationary bristles and/or bristle discs, wherein the bristle area is additionally formed from mobile bristles and/or bristle discs whose base area can be displaced relative to the base area of the stationary bristles or bristle discs in such a way that a free space between the stationary bristles or bristle discs that can be loaded with the cosmetic by dipping the brush into the reservoir can be arbitrarily varied.

21 Claims, 12 Drawing Sheets

(56) References Cited

U.S. PATENT DOCUMENTS

| | | | |
|---|---|---|---|
| 6,691,716 B2* | 2/2004 | Neuner et al. | 132/218 |
| D504,570 S * | 5/2005 | Marleau | D4/114 |
| 7,992,577 B2* | 8/2011 | De Brouwer et al. | 132/218 |
| 8,087,415 B2* | 1/2012 | Pires et al. | 132/218 |
| 8,276,596 B2* | 10/2012 | Marciniak-Davoult et al. | 132/200 |
| 8,336,560 B2* | 12/2012 | Dumler et al. | 132/218 |
| 2002/0014251 A1* | 2/2002 | Gueret | 132/218 |
| 2004/0112398 A1* | 6/2004 | Grant et al. | 132/151 |
| 2006/0249171 A1* | 11/2006 | Kurek et al. | 132/218 |
| 2009/0065020 A1* | 3/2009 | Butcher et al. | 132/218 |
| 2009/0120452 A1* | 5/2009 | Rebours | 132/218 |
| 2009/0194127 A1* | 8/2009 | Pires et al. | 132/218 |
| 2009/0276973 A1* | 11/2009 | Bouix et al. | 15/206 |
| 2010/0175708 A1* | 7/2010 | Kim | 132/218 |
| 2010/0212682 A1* | 8/2010 | Pires et al. | 132/218 |
| 2011/0048448 A1* | 3/2011 | Legassie | 132/218 |
| 2011/0114112 A1* | 5/2011 | Tsai | 132/218 |

FOREIGN PATENT DOCUMENTS

| | | |
|---|---|---|
| JP | 2008149047 A | 7/2008 |
| WO | 2006130643 A2 | 12/2006 |
| WO | 2009095610 A2 | 8/2009 |

* cited by examiner

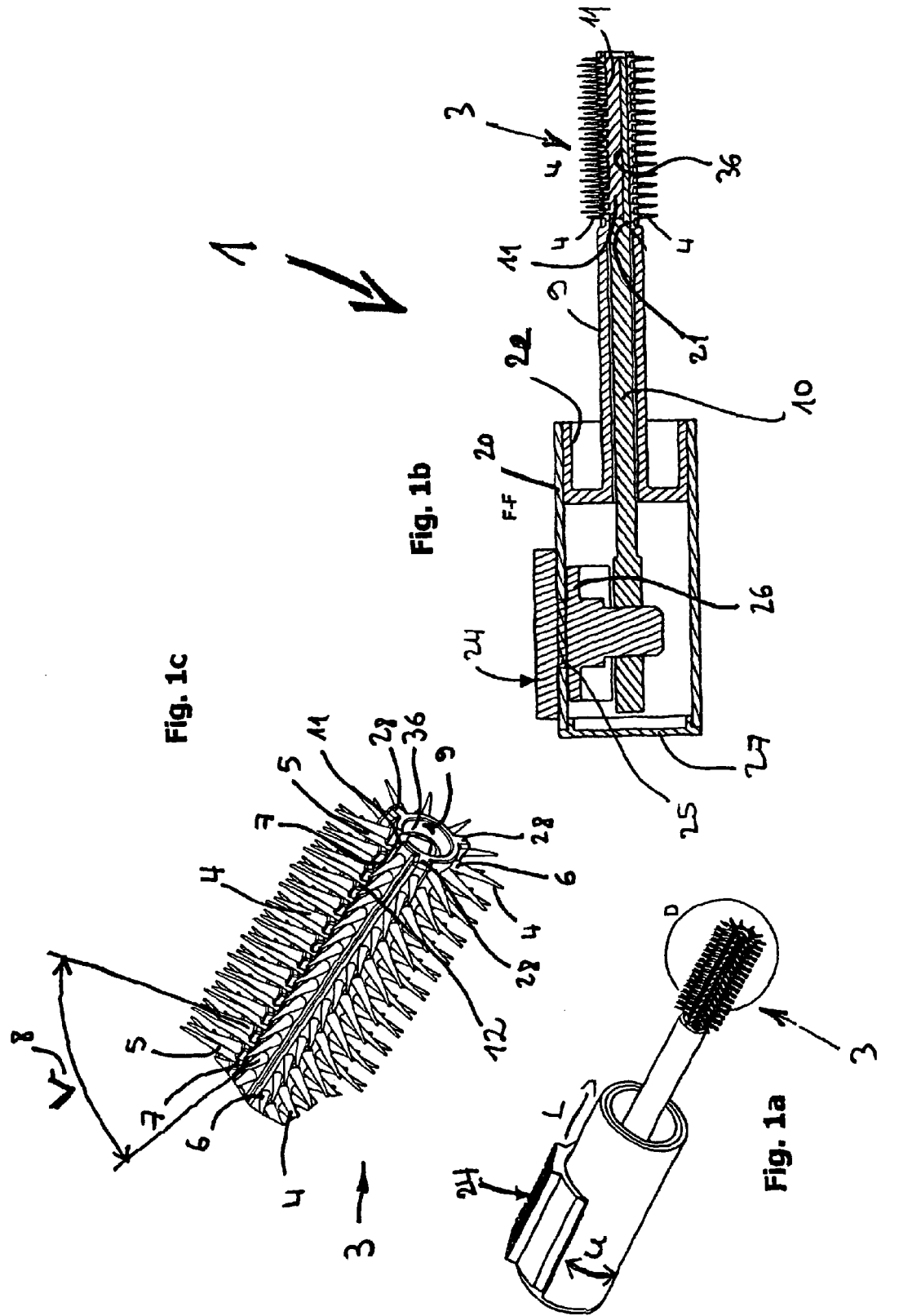

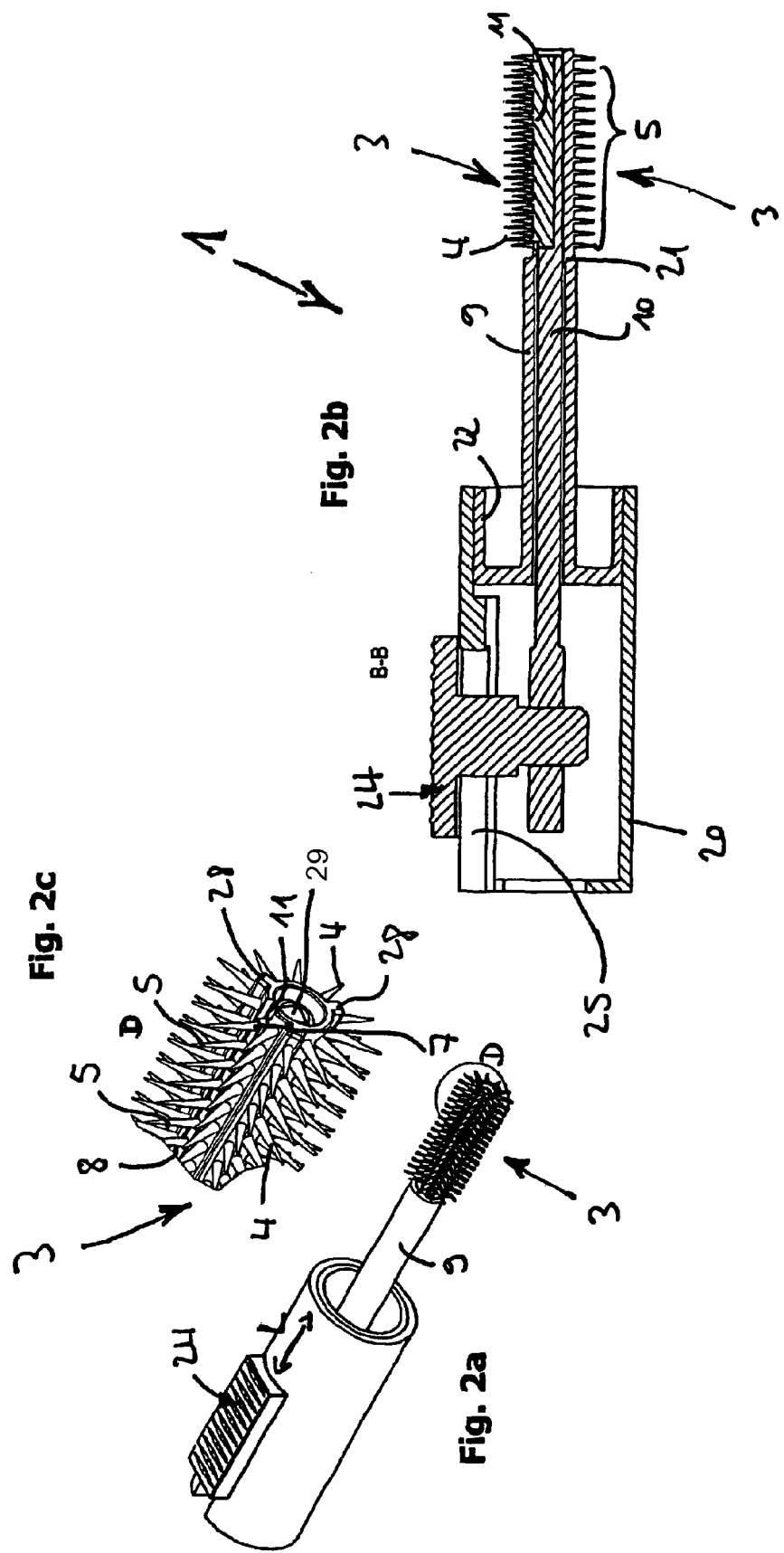

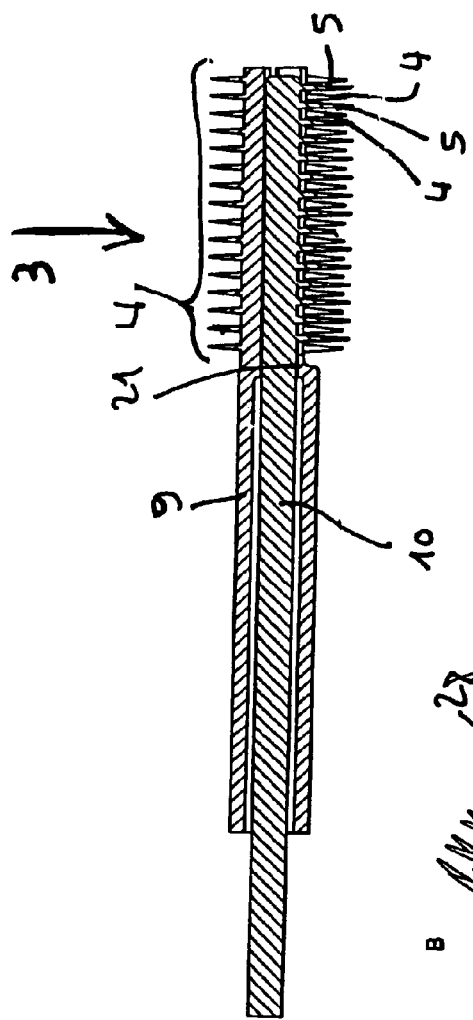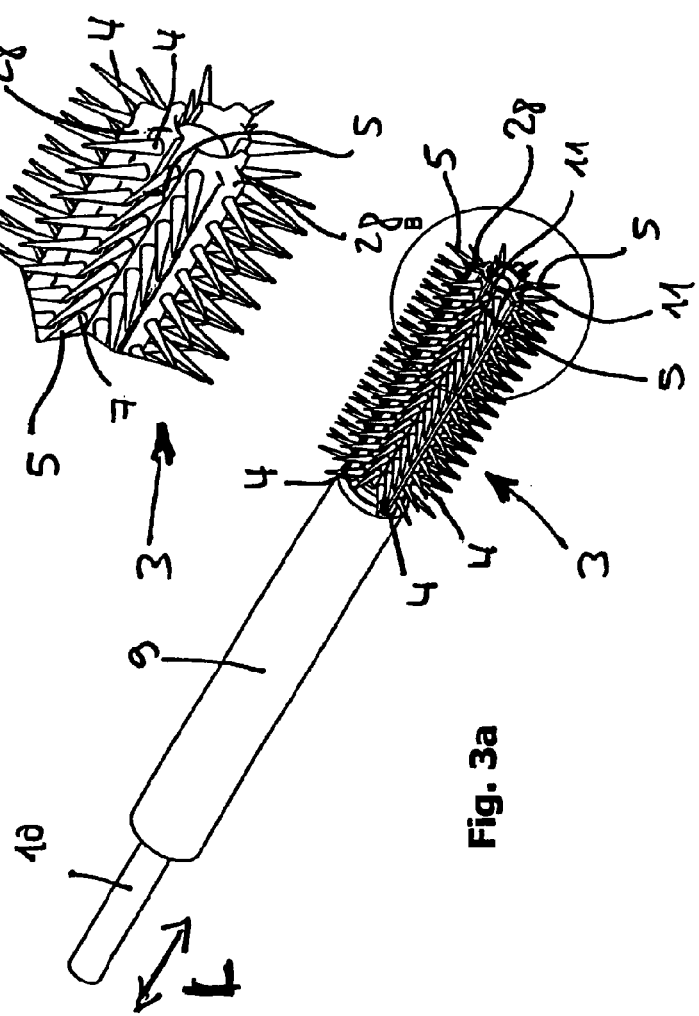

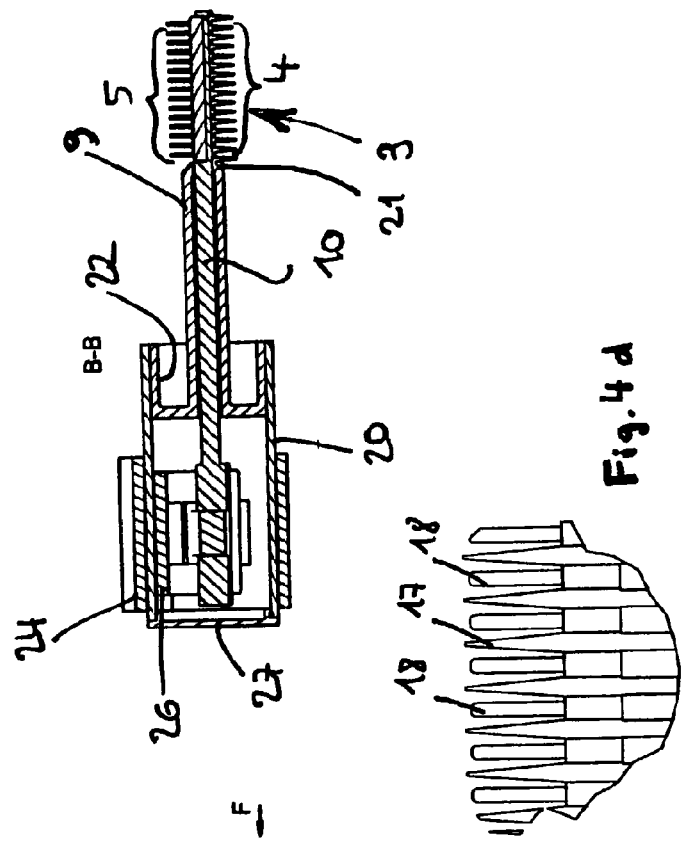
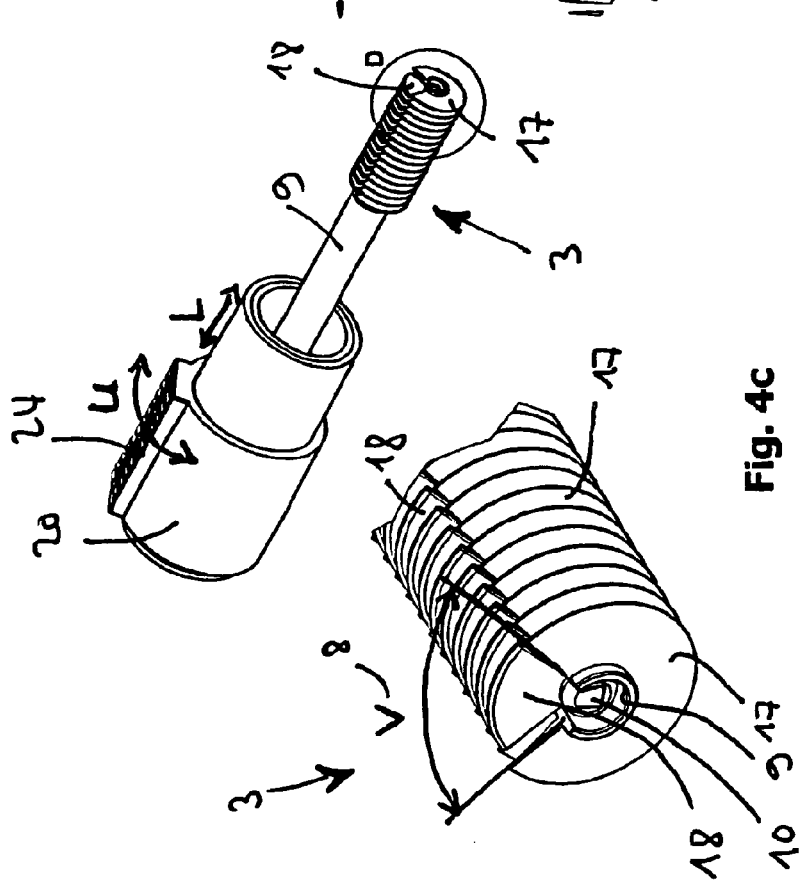
Fig. 4a  Fig. 4b  Fig. 4c  Fig. 4d

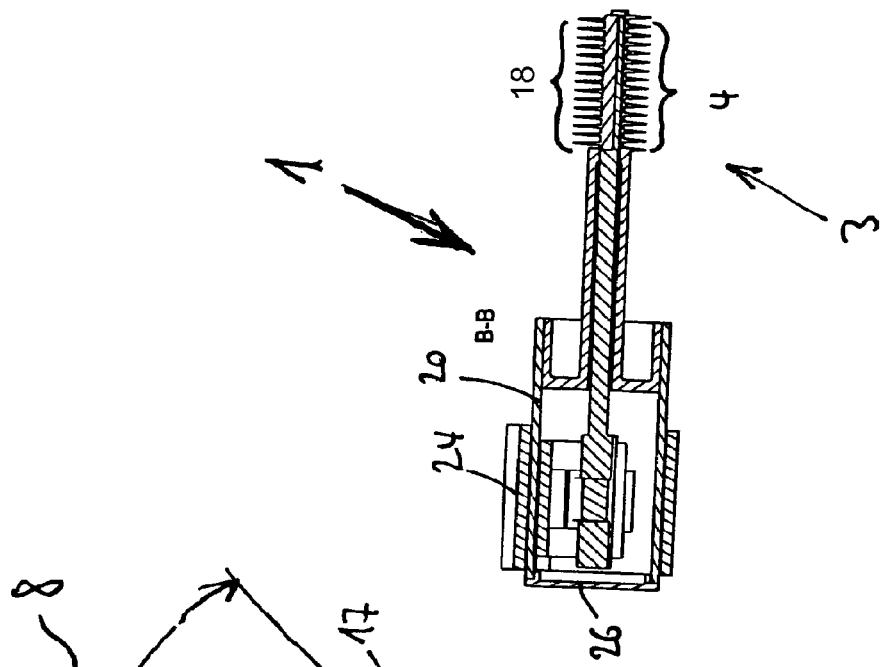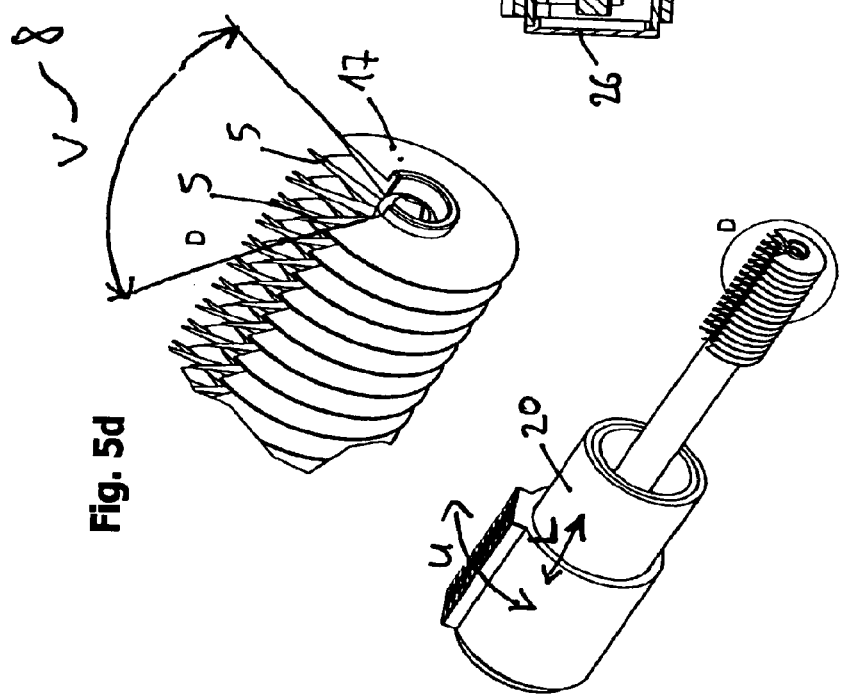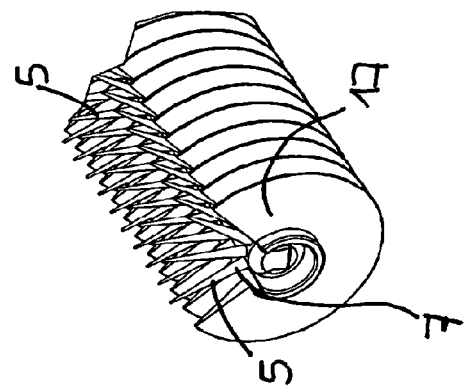

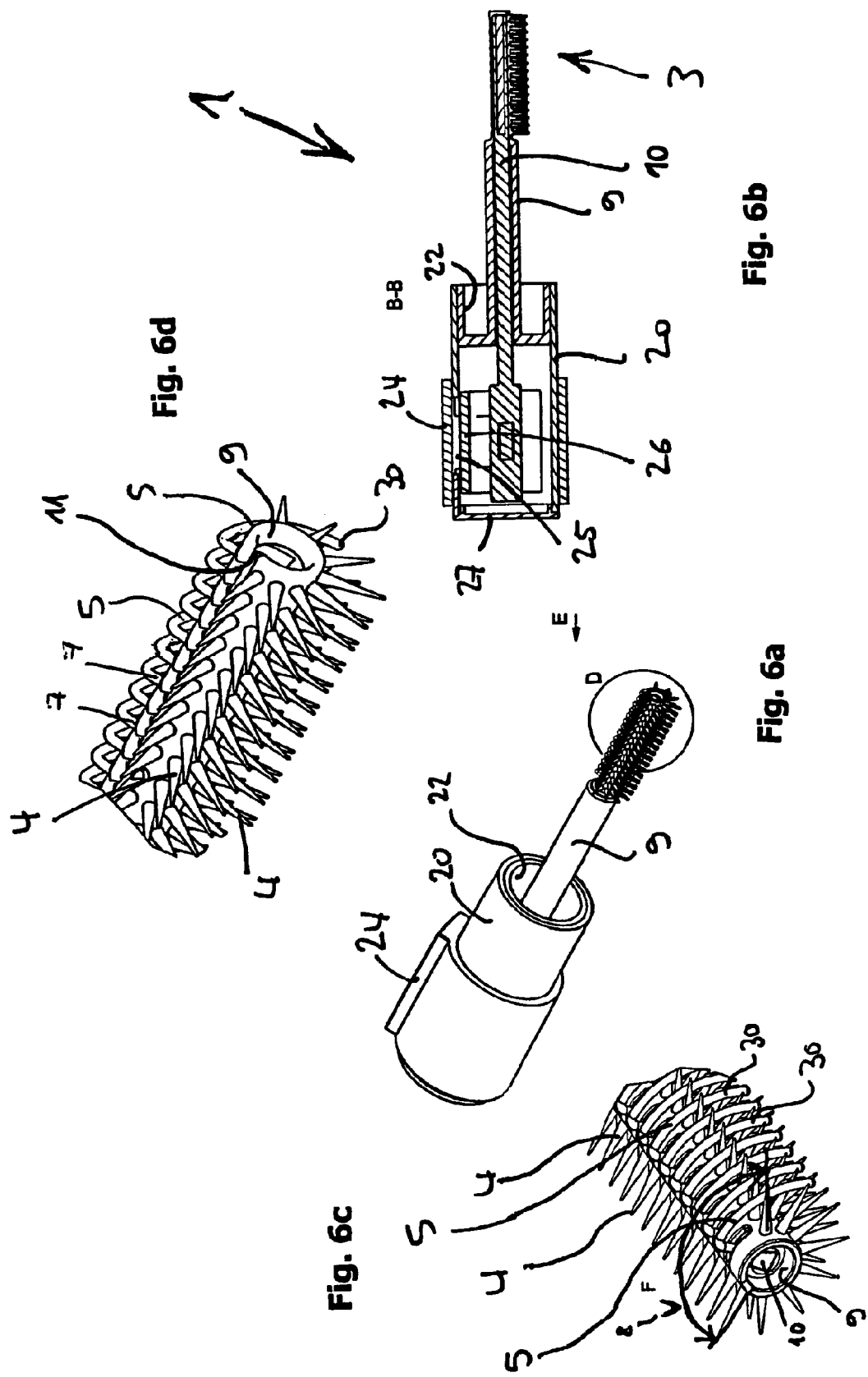

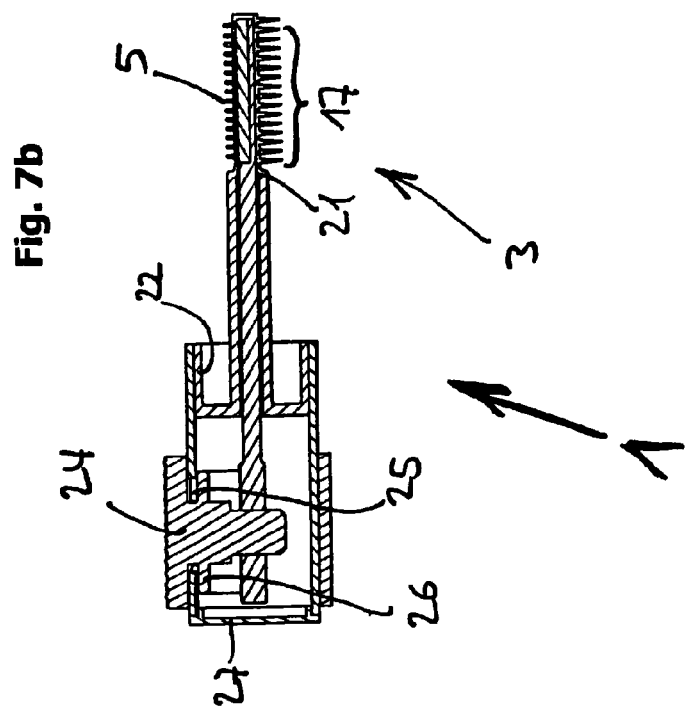
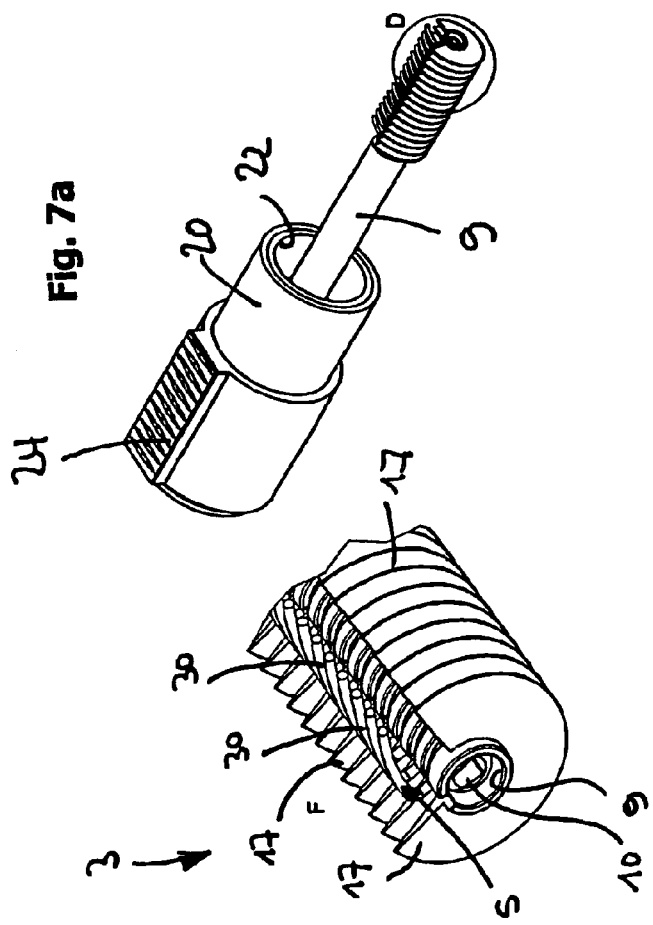

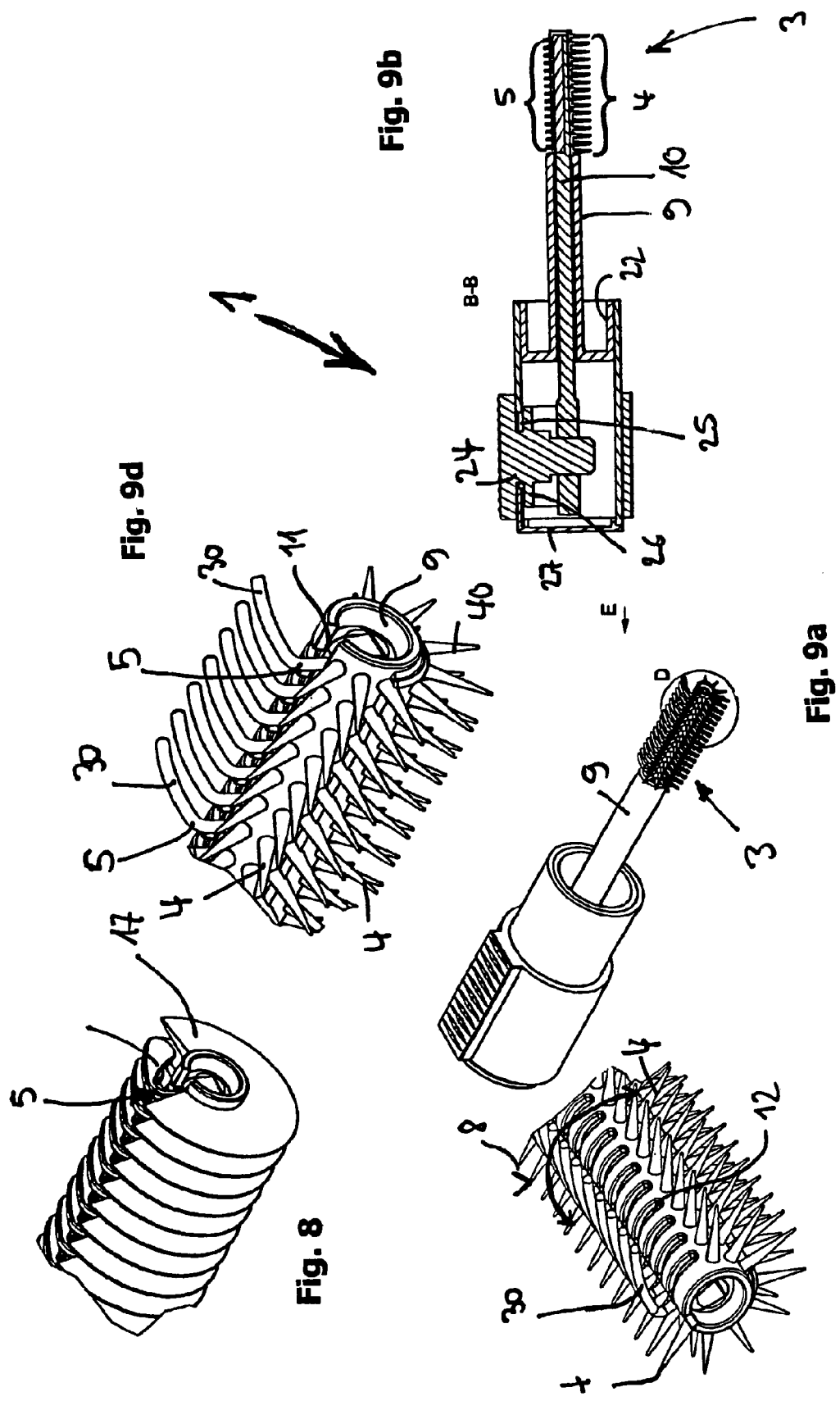

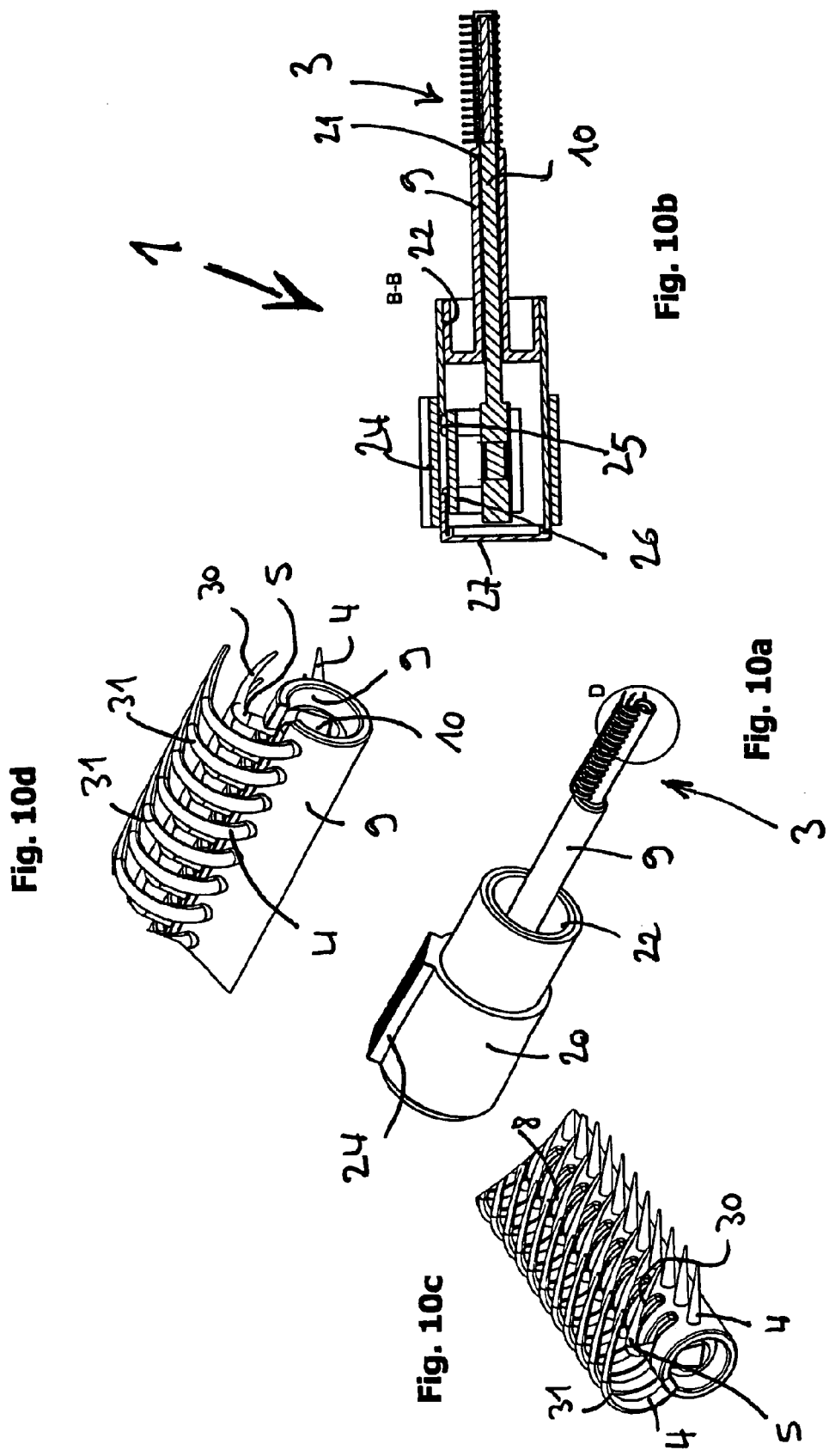

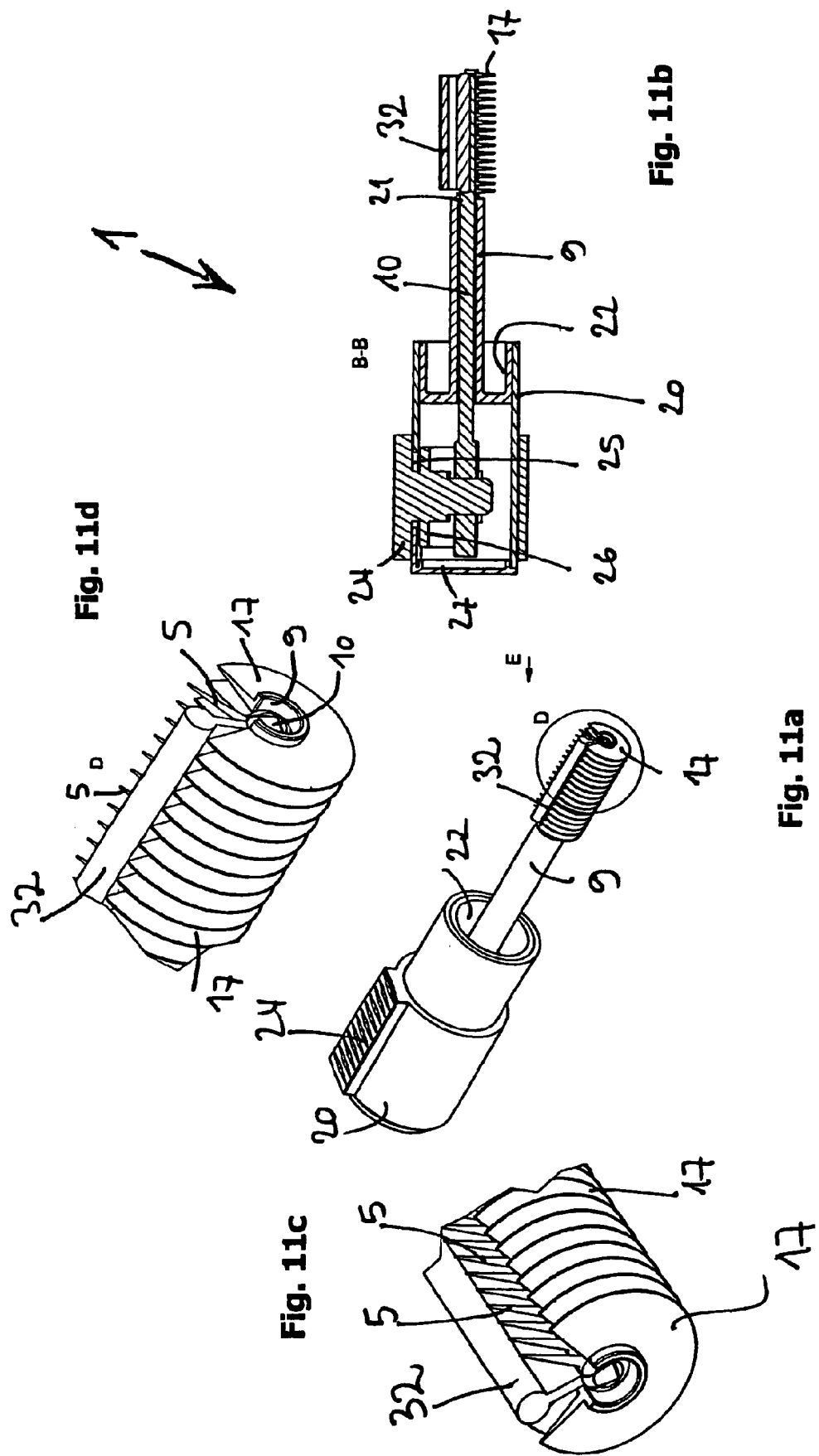

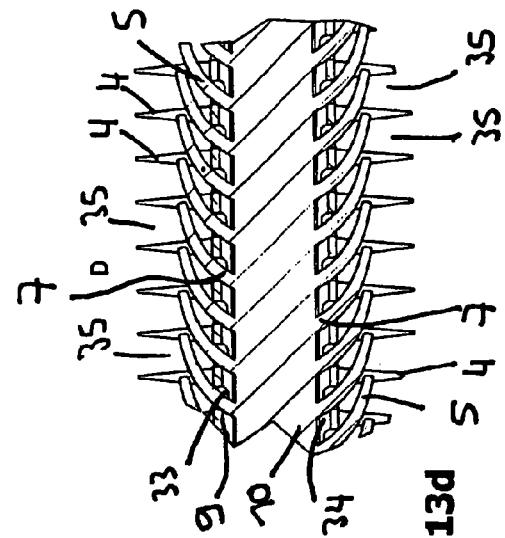
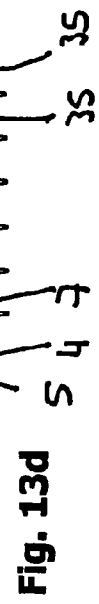
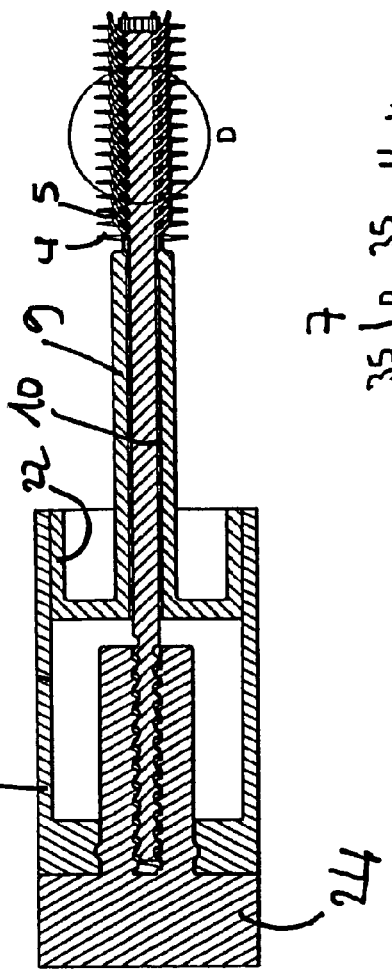
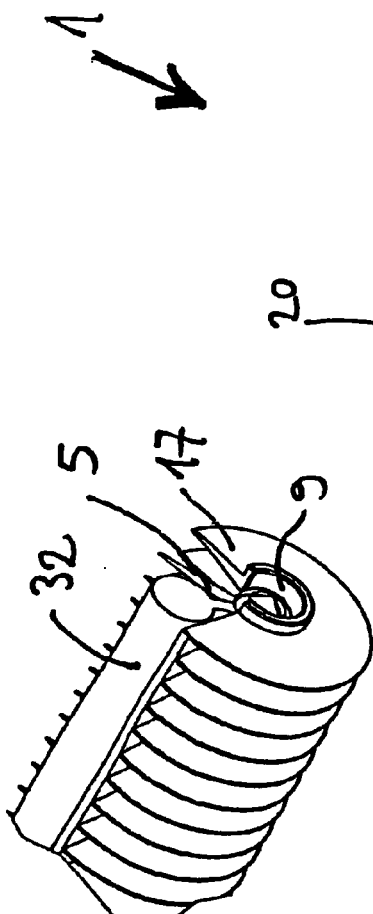
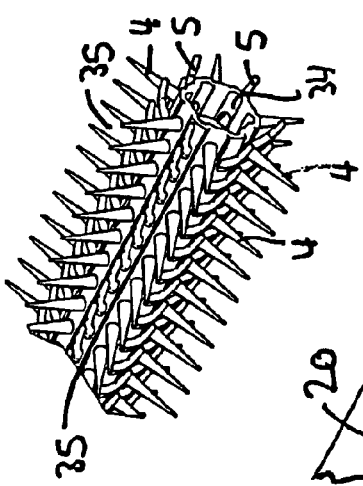
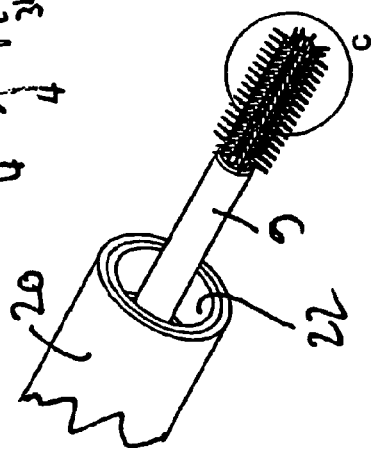
Fig. 12
Fig. 13a
Fig. 13b
Fig. 13c
Fig. 13d

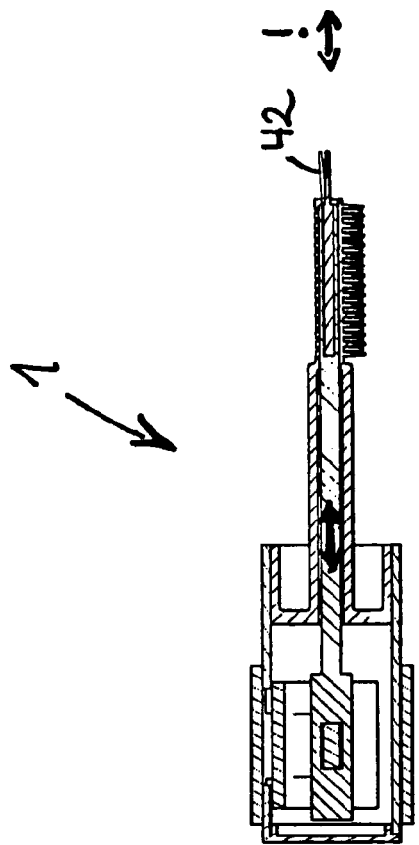
Fig. 14b
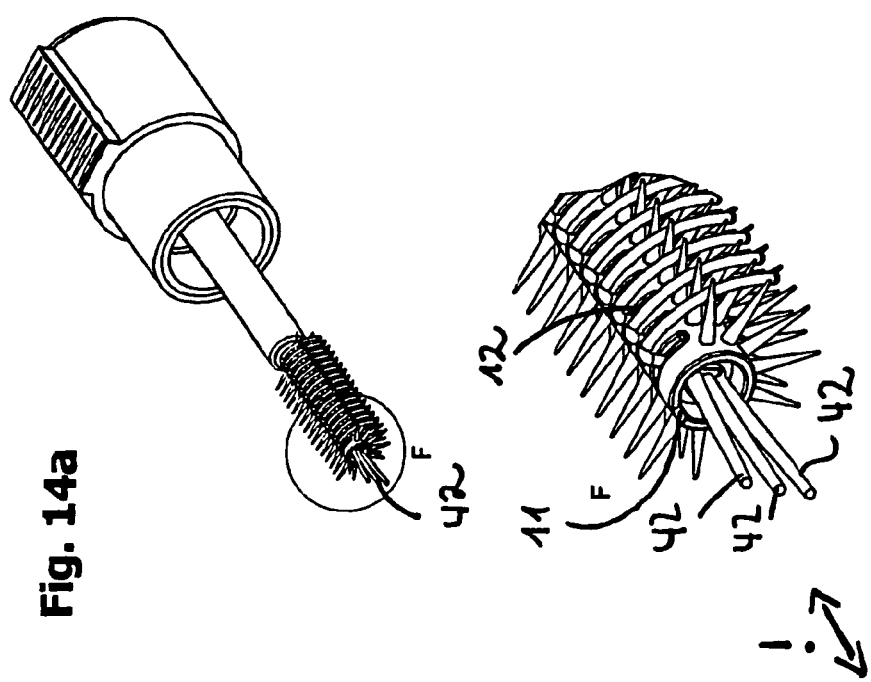
Fig. 14a
Fig. 14c

COSMETIC APPLICATOR WITH INTERNAL APPLICATORS THAT CAN BE PUSHED OUT AND ROTATED

FIELD OF THE INVENTION

The invention relates to an applicator comprising a brush for applying decorative cosmetics that have a flowable consistency until drying subsequent to application.

BACKGROUND OF THE INVENTION

Such cosmetics, whose typical representatives include mascara, are usually applied out of a bottle-like storage container by the bristle of the applicator being dipped into the storage container and thus charged with the cosmetic.

Such bristles most frequently comprise a rod-shaped carrier, with a bristle area, which extends in the circumferential direction and consists of predominantly outwardly protruding bristles, being disposed in the area of the outer circumference of said carrier. This bristle area comprises stationary bristles, i.e. bristles whose base area is permanently fixed in a single position relative to the handle of the applicator.

Such applicators are known in a variety of forms. They predominantly serve for applying a cosmetic to hair; mascara applicators are downright typical representatives for them. Partially, the applicators discussed herein are also used for dyeing eyebrows and sometimes also for dyeing other strands of hair.

The brushes of such applicators generally have multiple functions. They are used both for applying the cosmetic as well as for combing and separating and frequently also for forming (curling) the treated hair or the treated strand of hair—as will be explained in the following introduction to the description with reference to the representative example of a mascara brush.

At the start of each application, the applicator brush is dipped into the mascara mass and charged by filling the free spaces between the bristles with the mascara mass. When the applicator brush is pulled out from the mascara supply, the applicator brush passes a wiper that determines the remaining amount of mascara on the applicator.

Control of the mascara charge is a decisive factor for the intended effect of the applicator:

If the mascara charge is reduced too much by the wiper, then too little mascara is applied to the eyelashes, which results only in an unsatisfactory make-up result or makes another application process necessary. If, however, too much mascara mass is applied to the eyelashes, then the eyelashes cannot be properly combed and separated, so that the make-up result has a coarse and lumpy appearance.

The intensity with which the applicator brush is charged by dipping and subsequent wiping depends on a number of factors including, decisively, the density of the bristle covering or the free volume between the bristles, but also the diameter, the length, the material-related rigidity of the bristles, the viscosity of the mascara mass as well as the properties of the wiper.

Because the number of the interlinked parameters is great, any design of the applicator brush in the end leads to a compromise between the application efficiency, the combing or separating effect and, optionally, curling.

Numerous attempts have already been made in the prior art to find designs that offer a compromise that finds as widespread an acceptance as possible.

For example, European patent application EP 1 478 256 and a number of other patent applications propose improving the performance of the applicator by using stationary bristles with different lengths on the same brush—most frequently, the applicator brush comprises at least a first area with shorter bristles and larger gaps between these bristles, which area can be loaded well with a larger amount of mascara mass and therefore serves for applying the mascara mass, i.e. for applying the mascara mass to the eyelashes. At least one area with longer bristles is adjacent thereto in the circumferential direction, by means of which the eyelashes can then be combed and separated efficiently.

The Japanese patent application 2008149047 A proposes a different approach for reaching a compromise that finds as widespread an acceptance as possible. According to the teaching of this patent application, the bristle of the applicator is also supposed to be provided with two different bristle areas consisting of stationary bristles, which, however, do not follow one after the other in the circumferential direction of the applicator brush, but are disposed side-by-side in the longitudinal direction of the applicator brush. The first (proximal) bristle area close to the handle is in this case provided with corresponding bristles and broad, groove-like free spaces between these bristles that are continuous in the longitudinal direction. It is therefore particularly suitable for applying the mascara mass to the eyelashes. In contrast thereto, the second bristle area distant from the handle (distal) is equipped with correspondingly long bristles. It is therefore particularly suitable for combing and separating the eyelashes already wetted with the mascara.

A wholly different approach is pursued with the applicator proposed by WO 2006/130643 A2. The applicator proposed by this document is an applicator comprising a motor-driven applicator brush comprising a bristle area which rotates or oscillates as a whole. Within the context of a special embodiment, an applicator brush is alternatively proposed which comprises a bristle area of predominantly stationary bristles within which a strip consisting of mobile bristles is provided. Said strip is driven by an electromagnetically excited spring-mass-oscillator which makes the strip oscillate in the longitudinal direction of the applicator brush about its rest position at the push of a button once the applicator brush has been pulled out of the storage container that puts on the mascara mass, has been wiped off and brought into contact with the eyelashes.

Whereas the two former types of applicator already represent a good compromise because they are quite well-suited both for applying as well as combing/separating, the latter motor-driven type of applicator has so far remained rather theoretical and was hardly able to penetrate the market—which is probably not least due to the fact that this motor-driven applicator likely has a not inconsiderable tendency to splatter, at least when the bristle field has not been meticulously wiped off prior to switching the motor on.

The problem posed by all of the applicator types is that the user is unable to readily exert an active influence on how intensively the applicator brush is charged, by dipping and subsequent wiping, with the mascara mass to be applied. Rather, the intensity with which the applicator brush is respectively loaded is decisively determined by the producer's design of the covering of the applicator brush, of the wiper and not least the consistency of the mascara mass or the cosmetic to be applied. Consequently, the user is presented with conditions that she has to accept if she wishes to use the specific product instead of turning to a product that is differently designed in this respect.

In view of this, it is the object of the invention to propose an applicator with a brush which allows the user to actively exert an influence on the application behavior of the bristle covering of the applicator, preferably specifically on how intensively the applicator brush is charged by dipping with the cosmetic that can subsequently be used for application.

SUMMARY OF THE INVENTION

According to this invention, the applicator brush comprises a bristle area consisting of bristles protruding outwards from the carrier. In this case, the bristle area comprises stationary bristles, i.e. bristles whose base area is positionally fixed. Additionally, the bristle area is formed of mobile bristles whose base area is displaceable relative to the base area of the stationary bristles, and which, at least in one of their possible positions, protrude into a free space or a kind of "groove" between the stationary bristles or of a part thereof, and in this position form the active (currently useable for the purpose of application) bristle area of the applicator together with the stationary bristles. In this case, the applicator brush is configured in such a manner that, at least in a part of the bristle area, the free space between the stationary bristles that can be charged with the cosmetic by dipping the brush into the reservoir containing the cosmetic and, if necessary, wiping the brush, can be influenced by the change of the position of the mobile bristles—and that this can be done arbitrarily, i.e. as determined by the user, whereby an applicator is provided which can be actively adjusted in its application behavior by the user.

Preferably, the configuration of the applicator brush is such that the user is able to bring the base area of the mobile bristles from a first into another, currently desired, position relative to the base area of the stationary bristles in a specific, and not just random, manner. Then, the base area of the mobile bristles substantially maintains the selected position due to friction, latching action and/or the holding forces exerted by the user at least while the applicator is dipped in, but preferably during the entire application.

In this case, the intensity of charging that is to be varied depends not only on the volume of the free space in a strict mathematical sense, but specifically also on how many bristles the free space is locally interspersed with or edged by, and what characteristic properties these bristles have (length, hardness, angle of these bristles to the surface of the bristle carrier), or on the specific geometry of this free space.

Other preferred embodiments, effects and advantages are apparent from the exemplary embodiments described with reference to the Figures listed below.

BRIEF DESCRIPTION OF THE DRAWINGS

FIGS. 1a to 1c show a first exemplary embodiment of the invention with mobile bristles moveable both in the longitudinal as well as the circumferential direction.

FIGS. 2a to 2c show a second exemplary embodiment of the invention, in which the mobile bristles are moveable only in the longitudinal direction.

FIGS. 3a to 3c show a third exemplary embodiment that largely corresponds to the second exemplary embodiment, but comprises several rows with mobile bristles.

FIGS. 4a to 4d show a fourth exemplary embodiment that substantially corresponds to the first exemplary embodiment, but uses bristle discs instead of bristles; here, FIG. 4d shows a partial side view.

FIGS. 5a to 5d show a fifth exemplary embodiment that substantially corresponds to the fourth exemplary embodiment, but uses mobile bristles instead of mobile bristle discs.

FIGS. 6a to 6d show a sixth exemplary embodiment in which the mobile bristles have a special curved shape.

FIGS. 7a to 7c show a seventh exemplary embodiment that for the most part corresponds to the sixth exemplary embodiment, but uses mobile bristle discs instead of mobile bristles.

FIG. 8 shows another exemplary embodiment representing a variation of the seventh exemplary embodiment and differing therefrom by the special type of the mobile bristles.

FIGS. 9a to 9d show a ninth exemplary embodiment of the invention, which also has bent mobile bristles configured as special gripping means.

FIGS. 10a to 10d show a tenth further exemplary embodiment configured as a special gripping means.

FIGS. 11a to 11d show an eleventh exemplary embodiment comprising a mobile filling body for optionally filling the v-shaped free space and/or displacing the cosmetic into surrounding bristle regions, or for gripping the eyelashes.

FIG. 12 shows a twelfth exemplary embodiment corresponding to the eleventh exemplary embodiment but having a slightly differently configured filling body.

FIGS. 13a to 13d show a thirteenth exemplary embodiment with mobile bristles that can be retracted into the interior of the applicator.

FIGS. 14a to 14c show another exemplary embodiment characterized by additional bristles that extend substantially in the longitudinal direction and can be pushed forward on the free end face of the applicator.

DETAILED DESCRIPTION OF THE PREFERRED EMBODIMENTS

FIGS. 1a, 1b and 1c describe a first exemplary embodiment of the applicator 1 according to the invention.

This exemplary embodiment is an applicator configured as a mascara brush.

As can best be seen in FIG. 1b, the applicator 1 comprises a handle 20. To this handle, a first carrier 9 fixed relative to the handle 20 is attached, the carrier being equipped with substantially radially outwardly protruding stationary bristles 4—the base area 6 (FIG. 1c) of these stationary bristles 4 is fixed to the first carrier 9. The stationary bristles are preferably produced integrally with the first carrier 9, as a rule by injection molding or by means of a 3D-printer. Ideally, the stationary bristles 4 form a bristle covering that substantially protrudes on all sides and is to be referred to in this case (at least substantially) as cylindrical. The latter comprises in at least one area a free space 8 that extends in the longitudinal direction and penetrates the bristle covering in this direction preferably over the entire length, and whose function according to the invention is to be explained below.

For completeness' sake, it should be noted that it is not very detrimental to the invention if the bristle covering, given a configuration that is otherwise the same, is made in a less than optimum quality to a certain extent and only has the shape of a semi-cylinder, or is even configured as a plane bristle covering penetrated by at least one free space of the type discussed herein.

In the present case, the first carrier 9 is configured in a tubular shape. It comprises a cavity which movably accommodates the second carrier 10.

The second carrier is equipped with mobile bristles 5. In this exemplary embodiment, the mobile bristles 5 form a comb-like row of individual bristles disposed, viewed in the longitudinal direction, one behind the other. In the present design, the mobile bristles 5 have been attached to the second carrier 10 after it has been inserted into the first carrier 9. For this purpose, the second carrier 10 has, on the end thereof facing away from the side of the handle, a seat 36 that is accessible from the end face, into which the part carrying the mobile bristles can be inserted or pushed in via the opening at the end face of the first carrier 9. Attachment is then effected by latching, gluing or welding, for example. The crucial point is that the base area 7 (cf. FIG. 1c) of the mobile bristles is fixed on the second carrier 10.

The stationary and mobile bristles together form the bristle area 3 of the applicator brush by means of which the application of the mascara mass onto the eyelashes and, optionally, the subsequent combing, separating and, optionally, also forming of the eyelashes is carried out. As will be explained later, the bristles may have different contours; preferably, they are consistently configured conically.

Whereas the inner surface of the first carrier 9 used in this case is configured to be smooth, its outer circumferential surface can be locally provided with strips 28, which give additional stability to the carrier 9 that is provided with through holes, and which divide the outer circumferential surface into sectors within which the mascara mass situated in the base area of the bristles is retained, which can contribute to improving the application behavior. In the present case, the strips 28 are provided on their outsides with bristles.

As can best be seen in FIG. 1c, the first carrier 9 is provided with a longitudinal slot 11. A number of circumferential slots 12, the function of which is to be explained later, leads into at least one lateral flank of this longitudinal slot 11.

Due to the longitudinal slot 11, a separate, in this case almost v-shaped free space 8 is formed between the stationary bristles 4, which are otherwise regularly arranged or distributed in a consistent pattern over the outer circumference of the first carrier 9, in the manner symbolized by the arc marked "V" in FIG. 1c (in the case of a non-circular, plane bristle area, the free space is of course not v-shaped, but rectangular as a rule). This free space 8—in addition to the free spaces between the individual stationary bristles that are not marked in detail here—is especially intended for being loaded with mascara mass, which is then available for application to the eyelashes. In contrast to the free spaces between the individual stationary bristles that are not marked in detail here, this free space 8 is variable since the mobile bristles 5 can be brought into different positions within the free space 8 by correspondingly rotating and/or displacing the second carrier 10 in the longitudinal direction 41.

For example, the circumferential slots 12 leading off in the circumferential direction from the longitudinal slot 11 permit positioning the mobile bristles 5 in such a way that they are aligned, viewed in the longitudinal direction, with a row of stationary bristles 4, i.e. positioning them in such a way that one mobile bristle 5, respectively, is located between two stationary bristles 4 or vice versa—as is illustrated by FIG. 1c. If the mobile bristles 5 assume this position, then the variable free space 8 is wide open and is thus loaded, when the applicator brush is dipped into the mascara, with a large quantity of mascara mass that can be applied to the eyelashes quite well, because it is not difficult to wet the eyelashes with the mascara mass provided in the open v-shaped free space.

On the other hand—which is not depicted in the Figures—it is possible as an alternative to position the base area 7 of the mobile bristles within the longitudinal slot 11 in such a manner, for example, that the mobile bristles continue the pattern of the stationary bristles—so that the bristle area 3 is in that case more or less closed in itself, at least substantially. If the mobile bristles 5 assume this position, then the variable free space 8 is wide open to a significantly lesser extent, i.e. the applicator brush, when it is dipped into the mascara mass, is loaded with a significantly different quantity of mascara mass, or the eyelashes come into contact with the mascara mass available in the free space 8 less intensively during application, because the mobile bristles constitute a certain obstacle for the eyelashes in this position.

The characteristics of the applicator brush can be adjusted over a wide range in this manner because the mobile bristles can be brought not only into the two above-described extreme positions, but also since a whole number of positions of the mobile bristles 5 between these two extremes is possible. It thus becomes possible that the user varies or adjusts the characteristics of the applicator brush in such a way that it corresponds to her individual application preference. In the process, objective conditions can also be allowed for at the same time, such as a change of material-specific properties, which can never be wholly ruled out—for example if, in case a mascara is only rarely used, the mascara mass thickens a little over time and changes its consistency and therefore the application behavior on the brush.

In addition, there is the option of using the mobile bristles also for distributing the mascara mass (or a part thereof), which is at first located in the v-shaped free space 8, in the adjacent free spaces between the stationary bristles. This may be done, for example, by moving the second carrier 10 back and forth in such a way that the mobile bristles execute a "windshield wiper-like" movement in the v-shaped free space 8, over which a certain movement in the longitudinal direction may optionally also be superimposed.

Therefore, it is not just that the user is able to exert influence on the intensity with which the v-shaped free space 8 is normally loaded, by positioning the mobile bristles 5 accordingly. Rather, she is also able to later influence the loaded amount by a certain part of the mascara charge being transported in between the surrounding bristles, which are in this case stationary, from the v-shaped free space 8, by more or less intensively moving the mobile bristles 5.

Especially with a view to FIG. 1c, it must be noted that the mobile bristles 5, because of their mobility and their capacity of being positioned relative to the stationary bristles, may also be used for gripping a number of eyelashes and forming them, for example by giving them an upward curl ("curling") before the mascara has completely dried. Because in the position shown by FIG. 1c, the stationary and the mobile bristles 4, 5, at least in the areas thereof close to the bases, stand so close next to each other that it is possible to temporarily retain between them a single eyelash, respectively, or several adjacent eyelashes to the required extent.

Moreover, given an appropriate configuration of the first and second carriers as well as of the handle 20 and an actuation device to be explained in more detail soon, there is the possibility of displacing the second carrier relative to the first carrier in the longitudinal direction, if required, in such a way that in that case at least a part of the mobile bristles lies outside the area covered with stationary bristles or the circumferential area. The part with the mobile bristles 5 is in that case cantilevered at the (distal) end face of the applicator facing away from the handle over the end of the first carrier 9 and there is available as a comb that can be accessed unimpeded by the stationary bristles (not depicted)—which is what the mobile bristles 5 that are disposed in a single row one behind the other in the longitudinal direction in the present exemplary embodiment are particularly suitable for, because they form a clearly comb-like structure.

The mounting section 22 of the first carrier 9 that serves for connecting the first carrier to the handle 20 at the same time forms an inner thread or a press fit, by means of which the handle is screwed or sealingly pushed on a corresponding collar of a bottle containing a supply of mascara. The section of the first carrier 9 that serves for attachment to the handle 20 thus forms a lid which seals the mascara container, which is not shown here, in a substantially air-tight manner if it is not used. At the same time, the section 22 also protects the interior of the handle 20 against the ingress of air, so that mascara mass that has penetrated into the interior of the handle 20 over time does not dry up all too quickly to the extent that the movability of the displaceable components is excessively impeded.

Apart from the mounting section 22 of the first carrier 9, the first carrier 9 has a substantially tubular shape. In the area of the end of the longitudinal slot 11 on the side of the handle, the first carrier is provided on the inside of its tube with a short sliding guide 21. The second carrier 10, which in this case also has the shape of a round rod, slides in this guide. This sliding guide has a sufficiently narrow gap width (possibly even a certain elastic bias) and thus functions as a gasket at the same time—by preventing an undesired escape of mascara mass from the mascara supply in the direction of the handle, but also by counteracting a long-term drying-up of the mascara supply.

The end of the second carrier 9 on the side of the handle is connected to the manipulator 24, which is in this case configured as a kind of slider and which is mounted in a correspondingly generously designed handle opening 25, and can therefore be pushed back and forth in the direction of the arrows U and L, as FIG. 1a illustrates. This manipulator 24 enables the user to adjust the position of the mobile bristles 5 from the handle 20 without coming into contact with the mascara mass in the process.

In the event latching positions (not shown here) for fixing the manipulator in certain preferred positions are not provided anyway, it is expedient that the manipulator 24 slides on the handle 20 with sufficient friction so that the position of the mobile bristles does not change inadvertently on its own. In order to determine during production the contact pressure required therefore, the manipulator bears on the inside of the handle a collar 26 that increases friction. This collar 26 moreover prevents mascara mass, which has possibly entered the handle over time, from coming into the area of the outside of the manipulator 24 via the opening 25. Moreover, the collar 26 improves the seal of the handle 20 also to the extent that the evaporation through the opening is minimized, so that the danger of the mascara supply drying up over a long period of time through the (small) air gap between the first and the second carrier is reduced further.

In certain cases, the manipulator is not fixed by latching or friction in such a way that it cannot become maladjusted of itself inadvertently. As can be seen, the manipulator, however, is in that case designed in such a way that the user can fix the mobile bristles for the duration of the application by just holding the manipulator 24 in a grip and thus preventing it from moving in an undesired manner.

The end of the handle 20 facing away from the applicator brush is provided with a lid 27 that seals the opening through which the second carrier 10 is inserted and optionally connected to the manipulator 24 during assembly.

FIGS. 2a, 2b and 2c describe a second exemplary embodiment of the applicator 1 according to the invention.

Where the FIGS. 1 and 2 are identical, the statements made above with regard to the first exemplary embodiment apply, mutatis mutandis, also to this second exemplary embodiment.

This second exemplary embodiment differs from the first exemplary embodiment by the fact that only a longitudinal slot 11 is provided in the first carrier 9—no circumferential slots 12 are provided here. Instead, the second carrier 10 is provided below the base area of the mobile bristles 5 with a guiding strip 29 (FIG. 2c). This ensures that the first and second carriers can be displaced relative to each other substantially only in the longitudinal direction.

Nevertheless, the variable free space 8 can be modified in different ways also in this exemplary embodiment.

As can best be seen in FIG. 2b, the handle 20 in this design has a very generously cut handle opening 25, so that the second carrier 10 can be displaced to the right in the longitudinal direction for a noticeable bit from the position shown in FIG. 2b. Thus, a substantial part of the mobile bristles 5 comes to lie outside the area of the stationary bristles 4 and thus also outside the variable free space 8, which is in this case also v-shaped, between the stationary bristles 4. Therefore, the applicator brush of this exemplary embodiment can be used in a similar manner as the brush known from the Japanese patent application 2008149047 A described in the introduction—with the difference that the length of the v-shaped free space, within which no mobile bristles 5 are located, can be adjusted as required, and with the further difference that, optionally, a comb formed by the mobile bristles is available at the proximal end of the applicator brush, just as already described above with respect to the first exemplary embodiment.

Furthermore, the v-shaped free space or its application behavior (in particular, however, also its combing and separating effect) can also be varied to a certain extent by the position of the mobile brushes being specifically adjusted—the mobile bristles 5 are either positioned in such a way that, viewed in the circumferential direction, they are disposed in a row with the respective stationary bristles 4, thus continuing the pattern of the stationary bristles—so that the bristle area is then more or less (substantially) closed in itself. Alternatively, the mobile bristles are positioned in such a way that, viewed in the circumferential direction, they are disposed in the gaps between the adjacent rows of stationary bristles, thus interrupting the pattern of the stationary bristles. This also results in different properties of application.

FIGS. 3a, 3b and 3c describe a third exemplary embodiment of the applicator 1 according to the invention.

This third exemplary embodiment differs from the second exemplary embodiment only by the fact that mobile bristles 5 are provided not only in a single circumferential area, but in several circumferential areas that are spaced from one another. Thus, the first carrier 9 comprises several parallel longitudinal slots 11. However, it does not comprise any circumferential slots in this exemplary embodiment. However, a variation is also conceivable that is not depicted, in which circumferential slots lead into each of the longitudinal slots, which thus comes close to the first exemplary embodiment.

Though FIGS. 3a to 3c dispense with showing the handle 20 again, this is also identical to that of the second exemplary embodiment.

FIGS. 4a, 4b and 4c describe a fourth exemplary embodiment of an applicator 1 according to the invention.

This fourth exemplary embodiment differs from the first exemplary embodiment only by the fact that rows of stationary bristles 4 disposed one behind the other in the circumferential direction are provided in the first exemplary embodiment, which in this fourth exemplary embodiment are each replaced by stationary bristle discs (to be exact, bristle disc sections). Another difference lies in the fact that in the first exemplary embodiment, a row of mobile bristles 5 disposed one behind the other in the longitudinal direction is provided, which in the fourth exemplary embodiment are replaced by mobile bristle discs 18 (to be exact, bristle disc sections). In this case, the mobile bristle discs 18 of this fourth exemplary embodiment are so expansive in the circumferential direction that they correspond to several (imaginary) side-by-side rows of mobile bristles disposed one behind the other in the longitudinal direction. In other regards, the first and fourth exemplary embodiments function in an identical manner and are also designed correspondingly.

The bristle discs 17, 18 preferably consist of a very flexible but in itself dimensionally stable material, preferably an elastomer. A good capacity for being wiped off is thus ensured. They preferably have a wall thickness that increases from the outer circumference towards the base area, cf. FIG. 4.

It is clear that the properties of application of the applicator brush can be changed massively, especially if such bristle discs are used, by the mobile bristle discs being brought into the different extreme positions or positions lying between them, which have in principle already been described in detail in connection with the first exemplary embodiment. This is due to the fact that it is a big difference, especially in the case of the rather bulky bristle discs 17, 18, whether the bristle area 3 is a result of a number of bristle discs closed all around, or of bristle discs 17 which, given appropriate positioning of the mobile bristle discs 18, are cut out, for example, over an angle of 90°, thus having a voluminous v-shaped gap 8 which can be generously charged with mascara mass, cf. FIG. 4c, where the v-shaped gap is illustrated by the arrow "V".

Moreover, the bristle discs are optionally quite suitable in order to carry out the curling that was already described in connection with the first exemplary embodiment—if the mobile bristle discs are pushed far into the free spaces between adjacent stationary bristle discs and have a correspondingly small spacing at least in the area close to their bases, they are able to retain the eyelashes between their large-surface flanks to the necessary extent and for the necessary time.

It should be noted that, in this fourth exemplary embodiment, circumferential slots that are not shown in more detail are provided, which allow rotating the mobile bristle discs 18 by about 90° in the circumferential direction, so that the mobile bristle discs can be moved completely into the gaps between stationary bristle discs 17. Thus, there is the possibility of distributing the mascara mass, which is at first situated in the v-shaped gap 8, over a large surface in the surrounding gaps between the stationary bristle discs.

Generally, and at the same time also referring to the first exemplary embodiment, it can be said that, in the case of an applicator brush having a circular or at least semi-circular bristle area, it is expedient to provide a v-shaped gap between the stationary bristles or bristle discs which spans over an angle range of at least 30° to about 120°. Moreover, it is expedient to design the mobile bristles or bristles to be moveable in such a way that they are able to sweep over an angle range of at least 30° to about 180° in the circumferential direction.

For completeness' sake, another variation of the fourth exemplary embodiment should be mentioned here which is not depicted as a drawing and also not numbered—if, in this fourth embodiment, the circumferential slots are omitted and if only a longitudinal slot is provided instead, then an exemplary embodiment is obtained which corresponds to the second exemplary embodiment, apart from the use of bristle discs instead of bristles, and which also works exactly in the same way.

FIGS. 5a, 5b, 5c and 5d describe a fifth exemplary embodiment of an applicator 1 according to the invention.

This fifth exemplary embodiment almost completely matches the fourth exemplary embodiment, with the main difference that the mobile bristle discs of the fourth exemplary embodiment being "resolved" again into several side-by-side rows of bristles standing one behind the other in the longitudinal direction, which of course has an influence on the variable v-shaped gap. Additionally, FIG. 5b includes both stationary bristles 4 and mobile bristle discs 18. Comparing FIGS. 4c and 5c, it can be seen that the v-shaped gap in this fifth exemplary embodiment is blocked to a lesser extent by the mobile bristles than by the mobile bristle discs of the fourth exemplary embodiment situated in the corresponding position.

FIGS. 6a to 6d describe a sixth exemplary embodiment of an applicator 1 according to the invention.

With regard to its functional principle, this sixth exemplary embodiment matches the first, fourth and fifth exemplary embodiments, so that the statements made there apply identically or mutatis mutandis.

The sole fundamental difference to the first exemplary embodiment is in this case that the mobile bristles extend not only in the substantially radial direction. Instead, they have towards their outer end a section 30 bent by about 90° against the radial direction. This section 30 is bent in itself in this case, and therefore substantially extends in the circumferential direction of the first carrier 9.

In this case, the applicator is configured in such a way that these mobile bristles 5 can be moved back and forth in the circumferential direction between two extreme positions. These two extreme positions are not depicted in a drawing but can be inferred from the intermediary position shown by FIG. 6c. The first extreme position is a position in which the base areas of the mobile bristles 5 are located at the outermost (left in the FIG. 6c) edge of the circumferential slots 12. The bent sections 30 of the mobile bristles in this case protrude obliquely over the entire variable free space 8. The second extreme position is a position in which the base areas of the mobile bristles 5 are located at the opposite outermost (right in the FIG. 6c) edge of the circumferential slots. The bent sections 30 of the mobile bristles are now situated almost completely in the gap between the stationary bristles so that the entire variable free space 8 is open, i.e. the mobile bristles do not extend over it.

In this manner, depending on the current position of the mobile bristles, influence is exerted on how much mascara mass that has first filled the variable free space 8 during dipping is removed again from the variable free space 8 in the course of wiping. The mobile bristles, or their bent sections 30, also in this case form a kind of "spacer" for the wiper, which is not shown, as long as they are not pushed completely into the free spaces between the stationary bristles.

As can be seen, the bent sections 30 extend far into the gap between rows of adjacent stationary bristles that are disposed one behind the other in the circumferential direction. Therefore, the bent sections 30 of the mobile bristles 5 are ideally suited for intensively distributing the mascara mass, which is at first located in the variable v-shaped free space 8, between the stationary bristles 4. In addition, they are optionally quite well suited for carrying out the curling process already described in connection with the first exemplary embodiment.

FIGS. 7a to 7d describe a seventh exemplary embodiment of an applicator 1 according to the invention.

The seventh exemplary embodiment is almost identical to the sixth exemplary embodiment. It differs from it only in that the stationary bristles of the sixth exemplary embodiment are replaced by bristle discs 17 of the type already described in more detail above.

FIG. 8 describes an eighth exemplary embodiment that is identical to the seventh exemplary embodiment. It differs from it only in that the mobile bristles 5 at the outer end of their bent section 30 are configured to be flat, so that in the position shown by FIG. 8 an even better cover of the variable free space 8 is made possible, and the capacity of being used for curling purposes is also improved.

FIGS. 9a to 9d describe a ninth exemplary embodiment of an applicator 1 according to the invention.

The ninth exemplary embodiment is almost identical to the sixth exemplary embodiment. It differs from it only in that the bent sections 30 of the mobile bristles 5 do not, as in the sixth embodiment, extend largely in the circumferential direction of the first carrier 9, but are more tangentially oriented relative to their respective base point—so that the bent sections 30 protrude to a greater degree from the applicator brush.

Therefore, the bent sections 30 of the mobile bristles of this exemplary embodiment, which are configured to be comparatively long, are eminently suitable to actively grip the eyelashes or actively guide them towards the applicator. For this purpose, the mobile bristles 5 are brought into the position shown by FIG. 9d, in which their bent sections 30 protrude expansively, "fork-like", as it were, from the applicator. Once the eyelashes have been introduced into the gaps between the mobile bristles, the mobile bristles are "twisted in", as it were. In the process, the applicator is brought up closer to the eye.

FIGS. 10a to 10d describe a tenth exemplary embodiment of an applicator 1 according to the invention.

The tenth exemplary embodiment substantially matches the ninth exemplary embodiment, so that the statements made there apply mutatis mutandis.

The difference to the ninth exemplary embodiment is that the tenth exemplary embodiment comprises at an edge of the variable free space 8 a row of stationary bristles 4 disposed one behind the other in the longitudinal direction, which have similarly bent sections 31 as was described above for the mobile bristles 5 having bent sections 30. The other edge of the variable free space 8 is edged by a row of regularly configured bristles, i.e. configured, for example, as in the first exemplary embodiment. The rest of the stationary bristle area will in many cases also be configured as described, for example, in the first exemplary embodiment. As the FIGS. 10a to 10c show, the latter is not an absolute requirement; depending on the goal, the bristle covering may, as an exception, also be omitted along the rest of the circumference of the first carrier 9.

As the Figures show, the mobile bristles can be positioned in such a way that they substantially abut the row with the stationary bent bristles 4 from the inside.

In this way, influence can be exerted on the application behavior of the variable free space 8 through the positioning of the mobile bristles, in accordance with the same principle as in all the other embodiments. If required, the bent bristles 5 on the other hand form, in cooperation with the also bent stationary bristles 4, a kind of eyelash curler which is ideally suited to carry out the curling process already described in the context of the first exemplary embodiment, and which of course also performs well with regard to separating.

FIGS. 11a to 11d describe an eleventh exemplary embodiment of an applicator 1 according to the invention.

The eleventh exemplary embodiment is almost identical to the fifth exemplary embodiment. It differs from it only in that, in addition to the stationary bristles, a mobile filling body 32 is provided which in this embodiment is configured to be beam-like and which consists of a narrow, approximately rectangular base section which towards the outside is adjoined by a rod-shaped section.

The mobile filling body 32 can be brought into different positions within the variable free space 8. If it is positioned in such a way that it comes to lie immediately adjacent to the stationary bristle discs 17 edging the variable free space 8, then a large continuous residual area of the free space 8 remains free on its other side. However, if it is positioned in such a way that it comes to lie in the center of the free space 8, then it divides the free space 8 into two remaining smaller residual areas. It is clear that the application behavior of the free space 8 can also be influenced in this manner, with the mobile filling body 32 exerting its influence in the present case in cooperation with the mobile bristles 5.

Due to the fact that the mobile filling body 32 is completely sealed in the circumferential direction, it also is capable of transporting the mascara mass, which is at first situated in the residual area(s) of the free space 8, rather effectively into the gaps between the adjacent stationary bristle discs 17 once it is moved back and forth in the circumferential direction.

For the same reason, the mobile filling body 32 can also be used very well, if required, for gripping individual eyelashes between itself and the adjacent stationary bristles 17 and to bring about the above-described curling process.

It is clear that the mobile filling body 32 can not only be usefully employed together with the stationary bristle discs 17, but also together with the stationary bristles according to the tenth exemplary embodiment, or also according to the first exemplary embodiment—anyway, according to the latter if one does without possibility of using it for curling.

FIG. 12 shows a twelfth exemplary embodiment of an applicator 1 according to the invention.

The twelfth exemplary embodiment is almost identical to the eleventh exemplary embodiment. The sole difference is that the rod-shaped section of the filling body in this exemplary embodiment has a larger diameter.

FIGS. 13a to 13d describe a thirteenth exemplary embodiment of an applicator 1 according to the invention.

Conceptually, the thirteenth exemplary embodiment cannot be compared with any of the exemplary embodiments so far.

What was already stated with regard to the first exemplary embodiment in respect of the first and second carrier 9 and 10, respectively, the handle 20 and the bristles 4, 5 applies unless otherwise stated below.

The decisive difference in this case is that the first carrier 9, as is not the case in the previous exemplary embodiments, does not comprise one or more slots which are completely continuous or continuous over a wide area and along which the mobile bristles can be pushed as a whole without being deformed themselves, in order to change the application behavior of the applicator.

Instead, the first carrier 9, in the area of the bristle area 3, is configured as a tube which is closed in itself in the circumferential direction and which has a number of locally limited retraction openings 33 through each of which a single mobile bristle 5 protrudes towards the outside (several individual mobile bristles may possibly also protrude outwards together through such a retraction opening). Each of these mobile bristles is attached to a second carrier 10 with its base area 7. The section of the second carrier 10 covered with the mobile bristles is displaceably mounted in the first carrier 9. Between the first and the second carriers, a gap is provided in the area of the mobile bristles which is sufficiently large to accommodate the mobile bristles and thus (cf., for example, FIG. 13c) works as a bristle accommodation means 34 whose local gap height corresponds at least to the diameter of the mobile bristles plus a certain allowance that prevents jamming between the first and second carriers that would otherwise be caused by the accommodated sections of the mobile bristles.

As can be seen in FIG. 13c, this bristle accommodation means 34 is formed in the present exemplary embodiment by several grooves on the inside of the first carrier 9, into which the mobile bristles 5 can respectively be retracted when the second carrier 10 is correspondingly displaced in the longitudinal direction. In the process, the surfaces on the inside of the first bristle carrier that form the edges of the grooves in the circumferential direction respectively serve as guide surfaces along which the second carrier slides with its corresponding counter-surfaces.

The mobile bristles 5 are sufficiently elastic to be bent in a "snake-like" manner without causing any malfunctions. Preferably, the mobile bristles are injection-molded to the second carrier 10.

If the second carrier 10 is now moved relative to the first carrier 9 in such a way that the base area 7 of a mobile bristle moves away from the associated retraction opening 33 through which this bristle protrudes to the outside through the first carrier, then the part of this bristle 5 that so far protruded outside over the first carrier is retracted along its longitudinal axis through the retraction opening 33 into the bristle accommodation means 34. The bristle 5 then protrudes to the outside only for a shorter bit. Conversely, this bristle is extended from the bristle accommodation means 34 along its longitudinal axis through the retraction opening 33 as soon as the second carrier moves relative to the first carrier in such a way that the base area 7 of a bristle approaches the associated retraction opening. The bristle then protrudes to the outside for a longer extent. It is clear that this changes the application behavior of the applicator.

If the applicator is equipped with mobile bristles 5 that protrude between the stationary bristles 4 surrounding them on all sides—as illustrated by this embodiment—then the local free space 35 between the surrounding stationary bristles (cf. FIGS. 13*c* and *d*) changes due to the retraction and extension of the mobile bristles, which leads to said change of the application behavior.

As a variation, it is, however, also conceivable that the mobile bristles described herein do not, or not only, protrude between the stationary bristles surrounding them on all sides, but rather, for example, into a v-shaped free space 8 that is wholly continuous or continuous over a larger area and which partially interrupts the covering consisting of stationary bristles, as described repeatedly in the context of the previous exemplary embodiments.

For completeness' sake, it should be noted that the manipulator 24 differs significantly from that described in the previously described embodiment, because in this case, a screw-like mechanism is used in order to displace the second carrier 10 relative to the first carrier 9 delicately and without any major exertion of force so as to retract or extend the mobile bristles 5.

FIGS. 14*a* to 14*c* describe a fourteenth exemplary embodiment of the applicator 1 according to the invention.

This fourteenth exemplary embodiment completely matches exemplary embodiment 9, so that the statements made there apply here as well.

The fourteenth exemplary embodiment differs from the ninth exemplary embodiment only in that in the fourteenth exemplary embodiment bristles 42 extending substantially in the longitudinal direction of the carrier, which can be retracted or extended depending on the position of the second carrier relative to the first carrier, are attached to the end face of the second carrier 10. In the extended state, these bristles provide a comb-like element that can be separately used for separating. In the retracted state, these bristles are situated completely within the first carrier and are therefore completely inactive, and thus constitute no obstacle at all.

It goes without saying that such additional bristles can not only be provided in an exemplary embodiment such as the ninth exemplary embodiment, but in the same way also in all other exemplary embodiments.

The invention claimed is:

1. An applicator for applying a decorative cosmetic with a flowable consistency from a storage container, comprising:

an applicator brush equipped with a bristle area having outwardly protruding bristles and/or bristle discs that comprises stationary bristles or bristle discs, wherein the bristle area is additionally formed from mobile bristles or bristle discs each having a base area that can be displaced relative to a base area of the stationary bristles or bristle discs in such a way that a free space between the stationary bristles or bristle discs that can be loaded with the cosmetic by dipping the brush into a reservoir can be arbitrarily varied, and that the mobile bristles or bristle discs can be positioned so as to be aligned, as viewed in a longitudinal direction, with a row of stationary bristles or bristle discs in such a way that one mobile bristle or bristle disc, respectively, is located between two stationary bristles or bristle discs and vice versa;

wherein the applicator brush comprises a first rod-shaped carrier in the shape of a tube to which the base area of the stationary bristles or bristle discs is fixed, and a second rod-shaped carrier, which is displaceable within the first rod-shaped carrier and to which the base area of the mobile bristles or bristle discs is fixed, the carriers being mounted in such a way that the carriers can be fixed relative to each other in a position arbitrarily selected by a user;

wherein the first rod-shaped carrier has on its outer circumference at least one circumferential slot through which at least one bristle or bristle disc of the second rod-shaped carrier can protrude outwards, into an application-ready position;

wherein at least one bristle or bristle disc can be brought into different positions relative to the bristles or bristle discs of the first rod-shaped carrier by displacement within the circumferential slot assigned to the at least one bristle or bristle disc that can be brought into different positions; and wherein the circumferential slot extends into an area between two or more stationary bristles or bristle discs disposed side-by-side in the longitudinal direction, so that the bristle or bristle disc that can be moved along the slot can be brought between adjacent stationary bristles or bristle discs in such a way that, viewed in the longitudinal direction, the bristle or bristle disc is in line with the stationary bristles or bristle discs.

2. The applicator according to claim 1, wherein the first rod-shaped carrier has on its outer circumference at least one longitudinal slot through which bristles or bristle discs of the second rod-shaped carrier protrude outwards, into an application-ready position between the bristles or bristle discs of the first rod-shaped carrier.

3. The applicator according to claim 2, wherein the bristles or bristle discs of the second rod-shaped carrier can be brought into different positions relative to the bristles or bristle discs of the first rod-shaped carrier by displacement within the longitudinal slot.

4. The applicator according to claim 1, wherein the stationary bristles or bristle discs form a first part of the bristle area which comprises a window that is free from stationary bristles or bristle discs and through which a number of mobile bristles or bristle discs, whose base area can be displaced within the confines of the window, protrudes outwards.

5. The applicator according to claim 1, wherein the applicator brush comprises mobile bristles or bristle discs whose base area is displaceable in a circumferential direction and which comprise towards their end a section which substantially extends in the circumferential direction and which is configured in such a way that, depending on the positioning of the base area, it is situated more or less far in a gap between two adjacent rows of stationary bristles or two adjacent stationary bristle discs.

6. The applicator according to claim 1, wherein the second rod-shaped carrier—instead of having at least one mobile bristle row or bristle disc extending in the longitudinal direction—comprises a filling body extending in the longitudinal direction.

7. The applicator according to claim 1, wherein at least a part of the bristles or bristle discs forming the mobile bristle or bristle disc area can be displaced in such a way that the bristles or bristle discs can be temporarily brought into a position outside of the stationary bristle or bristle disc area.

8. The applicator according to claim 1, wherein the second rod-shaped carrier comprises, at an end face thereof facing away from a handle of the applicator, a bristle covering or comb, which, depending on the position of the second rod-shaped carrier, is situated within the first rod-shaped carrier or protrudes from an opening at an end face of the first rod-shaped carrier.

9. The applicator according to claim 1, wherein the second rod-shaped carrier comprises at a free end face several additional bristles or bristle discs, which can be brought into a retracted state in which the additional bristles or bristle discs lie substantially completely within the first rod-shaped carrier, and into an extended state in which the additional bristles or bristle discs make a comb-like structure that serves for separating available to the user.

10. The applicator according to claim 1, wherein the first rod-shaped carrier comprises a number of retraction openings through which one bristle or bristle disc, respectively, or one bunch of mobile bristles or bristle discs, respectively, of the second rod-shaped carrier protrudes from the inside to the outside, wherein a length with which the one bristle or bristle disc, respectively, or one bunch of mobile bristles or bristle discs, respectively, protrudes, can be changed by the second rod-shaped carrier being displaced relative to the first rod-shaped carrier.

11. An applicator for applying a decorative cosmetic with a flowable consistency from a storage container, comprising:
an applicator brush equipped with a bristle area having outwardly protruding bristles and/or bristle discs that comprises stationary bristles or bristle discs, wherein the bristle area is additionally formed from mobile bristles or bristle discs each having a base area that can be displaced relative to a base area of the stationary bristles or bristle discs in such a way that a free space between the stationary bristles or bristle discs that can be loaded with the cosmetic by dipping the brush into a reservoir can be arbitrarily varied, and that the mobile bristles or bristle discs can be positioned so as to be aligned, as viewed in a longitudinal direction, with a row of stationary bristles or bristle discs in such a way that one mobile bristle or bristle disc, respectively, is located between two stationary bristles or bristle discs and vice versa;
wherein the applicator brush comprises a first rod-shaped carrier in the shape of a tube to which the base area of the stationary bristles or bristle discs is fixed, and a second rod-shaped carrier, which is displaceable within the first rod-shaped carrier and to which the base area of the mobile bristles or bristle discs is fixed, the carriers being mounted in such a way that the carriers can be fixed relative to each other in a position arbitrarily selected by a user;
wherein the first rod-shaped carrier has on its outer circumference at least one longitudinal slot through which bristles or bristle discs of the second rod-shaped carrier protrude outwards, into an application-ready position between the bristles or bristle discs of the first rod-shaped carrier; and
wherein at least one longitudinal slot is provided into which at least one circumferential slot leads.

12. The applicator according to claim 11, wherein the bristles or bristle discs of the second rod-shaped carrier can be brought into different positions relative to the bristles or bristle discs of the first rod-shaped carrier by displacement within the longitudinal slot.

13. The applicator according to claim 11, wherein the first rod-shaped carrier has on its outer circumference at least one circumferential slot through which at least one bristle or bristle disc of the second rod-shaped carrier can protrude outwards, into an application-ready position.

14. The applicator according to claim 13, wherein at least one bristle or bristle disc can be brought into different positions relative to the bristles or bristle discs of the first rod-shaped carrier by displacement within the circumferential slot assigned to the at least one bristle or bristle disc that can be brought into different positions.

15. The applicator according to claim 11, wherein the stationary bristles or bristle discs form a first part of the bristle area which comprises a window that is free from stationary bristles or bristle discs and through which a number of mobile bristles or bristle discs, whose base area can be displaced within the confines of the window, protrudes outwards.

16. The applicator according to claim 11, wherein the applicator brush comprises mobile bristles or bristle discs whose base area is displaceable in a circumferential direction and which comprise towards their end a section which substantially extends in the circumferential direction and which is configured in such a way that, depending on the positioning of the base area, it is situated more or less far in a gap between two adjacent rows of stationary bristles or two adjacent stationary bristle discs.

17. The applicator according to claim 11, wherein the second rod-shaped carrier—instead of having at least one mobile bristle row or bristle disc extending in the longitudinal direction—comprises a filling body extending in the longitudinal direction.

18. The applicator according to claim 11, wherein at least a part of the bristles or bristle discs forming the mobile bristle or bristle disc area can be displaced in such a way that the bristles or bristle discs can be temporarily brought into a position outside of the stationary bristle or bristle disc area.

19. The applicator according to claim 11, wherein the second rod-shaped carrier comprises, at an end face thereof facing away from a handle of the applicator, a bristle covering or comb, which, depending on the position of the second rod-shaped carrier, is situated within the first rod-shaped carrier or protrudes from an opening at an end face of the first rod-shaped carrier.

20. The applicator according to claim 11, wherein the second rod-shaped carrier comprises at a free end face several additional bristles or bristle discs, which can be brought into a retracted state in which the additional bristles or bristle discs lie substantially completely within the first rod-shaped carrier, and into an extended state in which the additional bristles or bristle discs make a comb-like structure that serves for separating available to the user.

21. The applicator according to claim 11, wherein the first rod-shaped carrier comprises a number of retraction openings through which one bristle or bristle disc, respectively, or one bunch of mobile bristles or bristle discs, respectively, of the second rod-shaped carrier protrudes from the inside to the outside, wherein a length with which the one bristle or bristle disc, respectively, or one bunch of mobile bristles or bristle discs, respectively, protrudes, can be changed by the second rod-shaped carrier being displaced relative to the first rod-shaped carrier.

* * * * *